(12) United States Patent
Won et al.

(10) Patent No.: US 7,246,526 B2
(45) Date of Patent: Jul. 24, 2007

(54) PRESSURE SENSOR, METHOD OF FABRICATING THE SAME, AND METHOD OF CALIBRATING THE SAME

(75) Inventors: Jong-hwa Won, Suwon-si (KR); Jung-ho Kang, Suwon-si (KR); An-sik Nam, Suwon-si (KR); Tae-sik Park, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 82 days.

(21) Appl. No.: 11/035,958

(22) Filed: Jan. 18, 2005

(65) Prior Publication Data

US 2005/0155433 A1 Jul. 21, 2005

(30) Foreign Application Priority Data

Jan. 17, 2004 (KR) ...................... 10-2004-0003603

(51) Int. Cl.
*G01L 9/16* (2006.01)
(52) U.S. Cl. ....................................................... 73/754
(58) Field of Classification Search ................. 73/718, 73/754, 724, 715, 700, 721, 722, 753, 706; 361/283, 283.4; 29/621.1; 257/252, 248
See application file for complete search history.

(56) References Cited

U.S. PATENT DOCUMENTS

| | | | |
|---|---|---|---|
| 3,626,096 A | 12/1971 | Von Muench et al. | |
| 5,528,452 A | 6/1996 | Ko et al. | |
| 5,578,843 A | 11/1996 | Garabedian et al. | |
| 6,051,853 A * | 4/2000 | Shimada et al. ............ | 257/252 |
| 6,109,113 A * | 8/2000 | Chavan et al. ................ | 73/718 |
| 6,802,222 B2 * | 10/2004 | Ishio et al. .................... | 73/718 |
| 6,877,383 B2 * | 4/2005 | Horie et al. ................... | 73/754 |

* cited by examiner

*Primary Examiner*—Jewel Thompson
(74) *Attorney, Agent, or Firm*—Sughrue Mion, PLLC

(57) ABSTRACT

A pressure sensor having a digital output includes a substrate formed with plural channels, and a gating part formed in such a way that an area confronting with the plural channels is spaced from the substrate and moved in response to an external pressure, thereby making the plural channels selectively conductive. Such a pressure sensor can obtain binary information of each channel from the fact that which is made to be conductive among the plural channels is determined by the movement of the area formed in the gating part to confront with the plural channels, and it is possible to measure a pressure within a set range from binary information of each of the plural channels. As a result, because a peripheral circuit of the pressure sensor can be simplified, the manufacturing costs and power consumption can be greatly reduced.

6 Claims, 14 Drawing Sheets

| Level | PhA | PhB | PhC | Vg0 | Vg1 | Vg2 | Vg3 | Vg4 | Vg5 | Vg6 | Vg7 |
|---|---|---|---|---|---|---|---|---|---|---|---|
| 0 | 0 | 0 | 0 | 0 | 0 | 0 | 0 | 0 | 0 | 0 | 0 |
| 1 | 1 | 0 | 0 | 1 | 0 | 0 | 0 | 0 | 0 | 0 | 0 |
| 2 | 0 | 1 | 0 | 1 | 1 | 0 | 0 | 0 | 0 | 0 | 0 |
| 3 | 1 | 1 | 0 | 1 | 1 | 1 | 0 | 0 | 0 | 0 | 0 |
| 4 | 0 | 0 | 1 | 1 | 1 | 1 | 1 | 0 | 0 | 0 | 0 |
| 5 | 1 | 0 | 1 | 1 | 1 | 1 | 1 | 1 | 0 | 0 | 0 |
| 6 | 0 | 1 | 1 | 1 | 1 | 1 | 1 | 1 | 1 | 0 | 0 |
| 7 | 1 | 1 | 1 | 1 | 1 | 1 | 1 | 1 | 1 | 1 | 0 |

PRESSURE SENSOR, METHOD OF FABRICATING THE SAME, AND METHOD OF CALIBRATING THE SAME

CROSS-REFERENCE TO RELATED APPLICATIONS

This application claims priority from Korean Patent Application No. 2004-03603 filed on Jan. 17, 2004 in the Korean Intellectual Property Office, the disclosure of which is incorporated herein by reference.

BACKGROUND OF THE INVENTION

1. Field of the Invention

The present invention relates to a pressure sensor, and in particular, to a pressure sensor having a digital output, a method of fabricating the same and a method of calibrating such a pressure sensor.

2. Description of the Related Art

A pressure sensor senses a pressure in a process or system and widely used in industrial measurement, automatic control, medical application, control of an automotive engine, environmental control, electric appliances or the like. A measuring principle of such a pressure sensor widely known in the art is to use displacement, distortion, magnet-heat conductivity, frequency or the like as a parameter.

Recently, such pressure sensors have been greatly improved in performance compared to cost and it has become possible to mass-produce them with the aid of developed semiconductor and micromachining technologies. In particular, multiplicated sensors formed by integrating plural pressure sensors in a single chip, multi-functionalized sensors formed by integrating sensors of different functions and intelligentized sensors formed by integrating electronics are being developed using the micromachining technologies.

Pressure sensors may be generally classified into mechanical type, electronic type and semiconductor type.

Representative examples of the mechanical type sensors are bourdon tube type sensors, diaphragm type sensors, and bellows type sensors. Among others, the elastic bourdon tube type sensors are most widely used today, in which a principle is employed that if a pressure to be measured is introduced into an open fixed end of a metallic pipe of a circular or planar cross-section, a closed tip end of the pipe is moved.

The most widely used type sensors next to the bourdon tube type sensors are flat plate type sensors and bellows type sensors, wherein the former measures a pressure on the basis of a flexure degree of a circular plate, which is proportional to a pressure difference, and the latter measures a pressure on the basis of a displacement of a bellows caused by a pressure difference between the interior and exterior of the bellows, in which the displacement is proportional to the pressure difference.

Most of the electronic type sensors are basically same with mechanical type ones except that a mechanical displacement is converted into an electric signal. For example, a capacitive type pressure sensor basically uses a method of measuring a displacement between two objects (electrodes) on the basis of the change in electrostatic capacity between the two objects.

Beyond the above-mentioned types, there are piezo-resistive sensors employing a strain gauge, piezo-electric sensors employing an organic or inorganic piezo-electric device, and LVDT inductive coil type sensors. Recently, optical pressure sensors employing an optical fiber or optical path difference have been developed and utilized for the purpose of sensing an ultra-high temperature environment or remote-sensing. Because the piezo-resistive sensors attain superiority over the other types in terms of performance and costs, they are most widely used.

In addition, the semiconductor pressure sensors, of which the practical use is accelerated, are characterized by no creep phenomenon, superiority in linearity, small-size and light-weight, and high resistance to vibration. Moreover, they are better than the mechanical type sensors in terms of sensitivity, reliability and productivity.

A semiconductor sensor comprises a diaphragm for converting a pressure into a distortional stress, and means for converting a power generated in the diaphragm into an electric signal. The diaphragm is formed by chemically etching single crystal silicon. Although the stress generated in the diaphragm may be converted into an electric signal using a change in natural frequency and surface acoustic wave of an oscillator, piezo-resistive and electrostatic capacitive modes are mainly used in converting the stress into an electric signal.

FIG. 1 is a cross-sectional view illustrating a structure of a conventional piezo-resistive pressure sensor. The piezo-resistive pressure sensor comprises a diaphragm 115 formed by etching an n-type semiconductor substrate 110 to a predetermined depth in relation to the bottom surface of the semiconductor substrate. In addition, p-type impurities are diffused at predetermined areas of the top surface of the n-type semiconductor substrate 110 to form p-type impurity regions 114, and the p-type impurity regions 114 are connected with each other by piezo-resistive devices 116.

Electrodes 122 are provided on the p-type impurity regions 114 of the opposite ends through a laminated oxidation film 120 to detect an electric signal produced in response to a change in resistance of the piezo-resistive devices 116.

The above-mentioned piezo-resistive pressure sensor measures a pressure using the change in resistance of the piezo-resistive devices 116 caused by an external pressure. The pressure sensor may be driven through a constant voltage mode or a constant current mode. However, each driving mode requires a compensation circuit capable of coping with a temperature because a piezo-resistive coefficient has a negative temperature characteristic.

FIG. 2 is a cross-sectional view illustrating a structure of a conventional electrostatic capacitive pressure sensor. The electrostatic capacitive pressure sensor includes a diaphragm 215 formed by etching an n-type semiconductor 210 to a predetermined depth in relation to the bottom surface of the semiconductor, a bottom electrode 212 formed by diffusing p-type impurities to a predetermined depth in relation to the top surface of the n-type semiconductor substrate 210, and a top electrode 216 formed using metal on the top surface of the n-type semiconductor substrate to confront with the bottom electrode 212.

The above-mentioned electrostatic capacitive pressure sensor experiences a change in electrostatic capacity between the electrodes 212, 216 facing one another if the distance between the electrodes 212, 216 is changed by a stress according to an external pressure. The stress can be detected by converting the change of electrostatic capacity into an electric signal.

Because no characteristic peculiar to semiconductors is applied to the electrostatic capacitive pressure sensor, the electrostatic capacitive pressure sensor is not necessarily limited to semiconductors. However, single crystal silicon is widely used in fabricating such an electrostatic capacitive pressure sensor because the single crystal silicon is superior as a material for a diaphragm and easy to fine-machine.

Although electrostatic capacitive pressure sensors are superior to piezo-resistive pressure sensors in sensitivity, there is little demand for the electrostatic capacitive pressure sensors because they have a structure that makes the formation of electrodes and connection to an external circuit complicate and they are poor in responsive performance. However, the electrostatic capacitive pressure sensors are very advantageous when they are used in a low-pressure area such as a living body because they are superior in temperature characteristic, small-sized and highly sensitive.

As described above, although a piezo-resistive pressure sensor and an electrostatic capacitive pressure sensor have several advantages in their own ways, the former has a disadvantage in that it is affected by a temperature and current consumption is high and the latter has a disadvantage in that it requires an external circuit for converting an electrostatic capacity into a voltage.

Furthermore, both of the piezo-resistive pressure sensor and the electrostatic capacitive pressure sensor have problems in that they both require a separate analog-digital converter because they employ an analog type interface, and the external circuits thereof are complicated because they require various amplifiers and signal modulators so as to determine an electrostatic capacity or resistance.

Consequently, existing pressure sensors have problems of high costs and difficulty in fabricating them as well as high consumption of power, due to the complexity of peripheral circuits rather than due to the complexity of the sensor structures themselves.

SUMMARY OF THE INVENTION

An aspect of the present invention is to provide a pressure sensor having a digital output so that consumption of power can be reduced and a peripheral circuit can be simplified, thereby saving costs. Another aspect of the present invention is to provide a method of fabricating such a pressure sensor.

In order to achieve the above aspects, there is provided a pressure sensor having a digital output comprising a substrate formed with plural channels; and a gating part formed in such a way that an area confronting with the plural channels is spaced from the substrate and moved in response to an external pressure, thereby making the plural channels selectively conductive.

In the above-mentioned pressure sensor, wherein the plural channels are arranged parallel to each other and formed by doping in such a way that each channel has a comb shape at a position confronting with the gating part. In addition, it is possible to form the plural channels in such a way that two channels symmetric about a central channel have a single channel output. Furthermore, the plural channels may be formed in such a way that they are classified into a predetermined number of groups and each group has a single output.

The gating part is formed in a shape of flat plate for generating a stress depending on an external pressure. The flat plate may be circular or rectangular.

The plural channels and the flat plate are formed in first and second semiconductor substrates, respectively, and the first and second semiconductor substrates are bonded together so that the flat plate can determine which to be made conductive among the plural channels according to an external pressure.

In order to achieve the above objects, there is also provided a method of fabricating a pressure sensor having a digital output, comprising steps of: etching a first semiconductor substrate at a predetermined area and depositing impurities for forming a flat plate along the etched side of the first semiconductor substrate; forming plural channels in a second semiconductor substrate to confront with the etched area of the first semiconductor substrate and depositing an insulation layer; putting the impurity-implanted side of the first semiconductor substrate and the channel-formed side of the second semiconductor substrate into contact with each other and bonding them; and etching the rear side of the etched area of the first semiconductor substrate, thereby forming the flat plate.

According to the present invention, there is also provided a method of fabricating a pressure sensor having a digital output, comprising steps of: etching a first semiconductor substrate at a predetermined area and depositing impurities for forming a flat plate along the etched side of the first semiconductor substrate; bonding the impurity-implanted side of the first semiconductor substrate to a second semiconductor substrate; etching the rear side of the etched area of the first semiconductor substrate, thereby forming the flat plate; forming plural channels in a third semiconductor substrate to confront with the etched area of the first semiconductor substrate; and putting the channel-formed area of the third semiconductor substrate to come into contact with the flat plate of the first semiconductor and bonding them.

In the fabricating method just described above, the step of forming the plural channels in the third semiconductor substrate comprises steps of: applying photoresist to the second semiconductor substrate and patterning channels; doping the patterned channels with impurities; removing the photoresist; forming plural electrodes for inputting signals into or outputting signals from the plural channels; depositing an insulation layer on the top surface of the third semiconductor substrate formed with the plural electrodes; and forming a through hole extending from the insulation layer through the third semiconductor substrate so that the external pressure can be transmitted to the flat plate.

Meanwhile, the plural channels are formed parallel to each other and doped in such a way that each channel has a comb shape at a position confronting with the flat plate. It is possible to form the plural channels in such a way that two channels symmetric about a central channel have a single channel output. In addition, it is also possible to form the plural channels in such a way that they are classified into a predetermined number of groups and two adjacent groups are spaced at a predetermined distance and the channel output of each group is recognized as a single channel output. That is, the structure and combination of the channels are not featured to a certain construction and may take various forms. The comb shapes of the channels can extend the effective area of the gating part.

According to another aspect of the present invention, there is also provided a method of calibrating a pressure sensor having a digital output, comprising steps of: setting an intensity of pressure according to an output signal from each of plural channels formed in a semiconductor substrate; detecting which is made conductive among the plural channels according to a movement of a flat plate, wherein the flat plate determines which to be made conductive among the plural channels according to an external pressure; estimating, as binary information, an output signal depending on which is made conductive among the plural channels conductive; and calculating the external pressure on the basis of the binary information and the previously set intensity of pressure.

Here, the pressure intensity setting step comprises steps of: applying a test pressure to the flat plate; and correcting a gating error of the flat plate for neighboring channels according to the test pressure.

The gating error correcting step converts the channel output values according to the gating error to be used as the output information for the test pressure. Thereafter, the pressure intensity is calculated according to a correct content for the channel signals according to the external pressure.

According to the present invention as described above, the flat plate generate a stress according to an externally exerted pressure thereby making the plural channels selectively conductive and allowing the external pressure to be measured from binary information depending on which is made conductive among the plural channels.

BRIEF DESCRIPTION OF THE DRAWINGS

The above aspects of the present invention will be more apparent from the description of exemplary embodiments of the present invention taken with reference to the accompanying drawings, in which.

DETAILED DESCRIPTION OF THE EXEMPLARY EMBODIMENTS OF THE PRESENT INVENTION

Hereinbelow, exemplary embodiments of the present invention will be described in detail with reference to the accompanying drawings.

The matters defined in the description such as a detailed construction and elements are provided to assist in a comprehensive understanding of the invention. Thus, it is apparent that the present invention can be carried out without those defined matters. Also, well-known functions or constructions are not described in detail since they would unnecessarily obscure the invention.

Figure 3A:
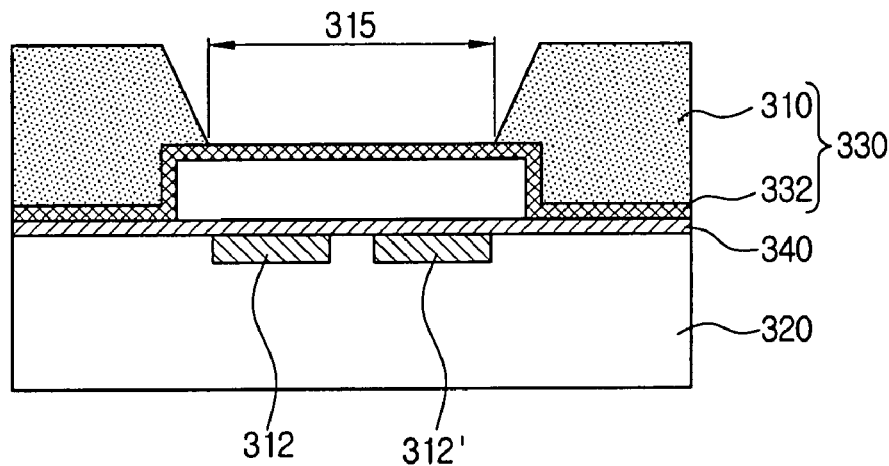
FIGS. 3A and 3B are a cross-sectional view and a perspective view of a pressure sensor according to an exemplary embodiment of the present invention, respectively.
Figure 3B:
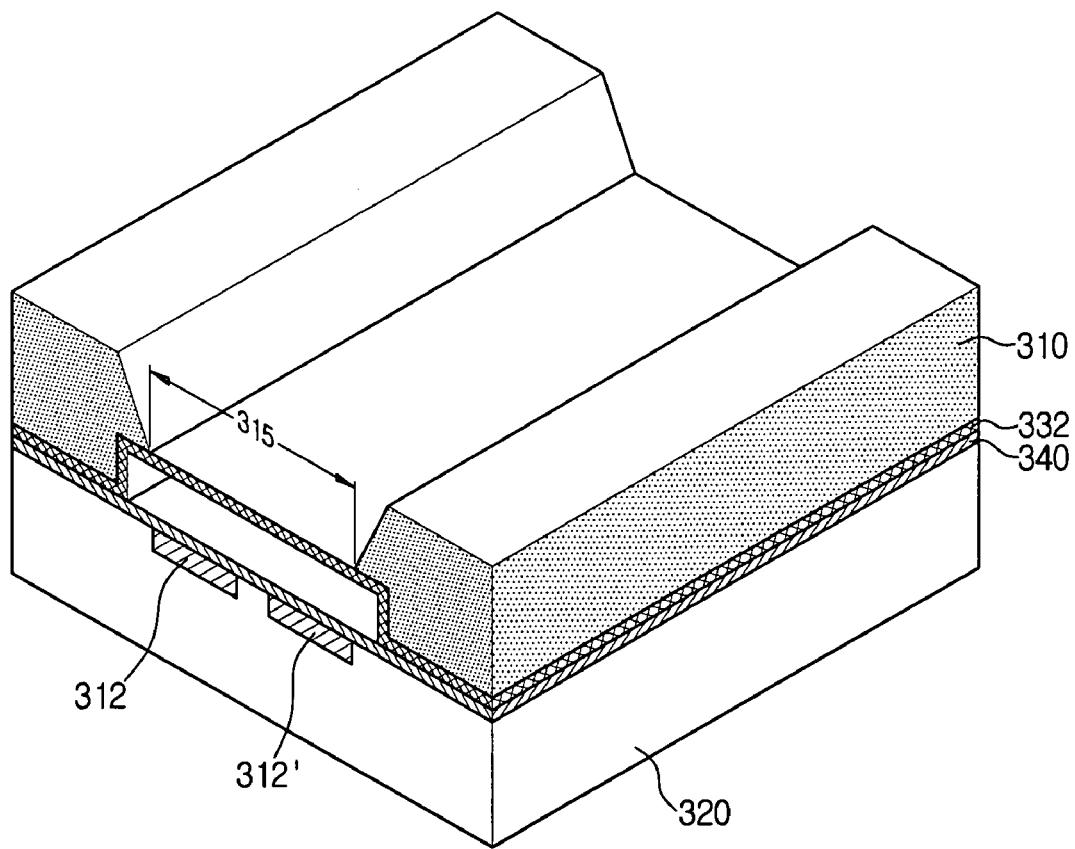
Figure 3C:
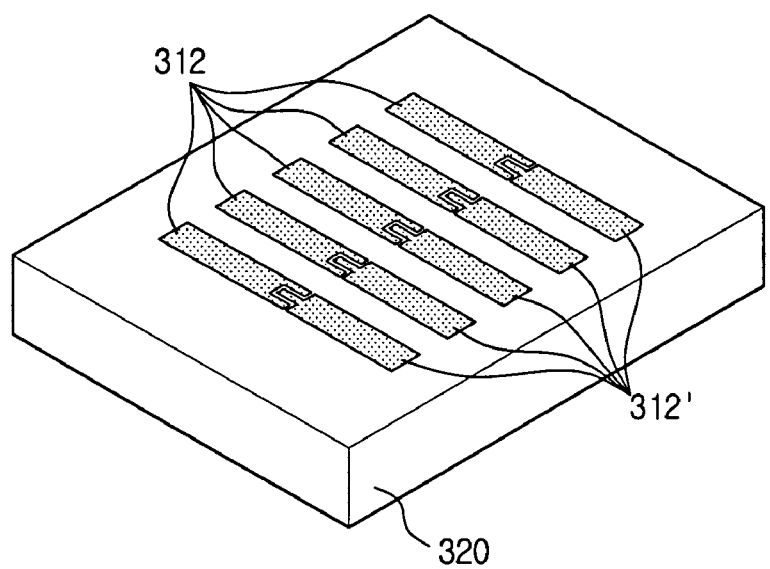
FIG. 3C is a perspective view of channels formed on a substrate.

FIGS. 3A and 3B are a cross-sectional view and a perspective view of a pressure sensor according to an exemplary embodiment of the present invention, respectively, and FIG. 3C shows a semiconductor substrate formed with plural channels.

The pressure sensor comprises a semiconductor substrate 320 formed with plural channels 312, 312' which are arranged parallel to each other as shown in FIG. 3C, and a gating part 330 bonded to the semiconductor substrate 320 and spaced from the channels 312, 312' in an area confronting with the channels 312, 312', so that the channels 312, 312' can be made selectively conductive as the gating part 330 is moved in response to an external pressure. An insulation layer 340 is deposited between the semiconductor substrate 320 and the gating part 330.

Figure 6A:
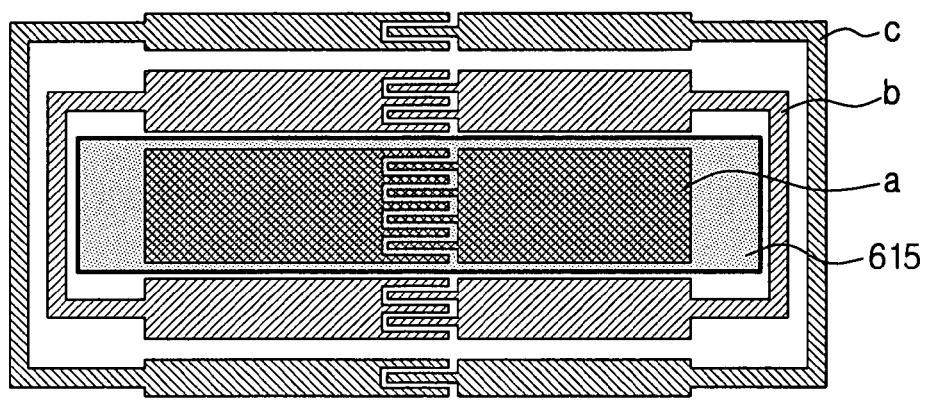
FIGS. 6A and 6B illustrate the symmetric structure of channels of a pressure sensor according to another exemplary embodiment of the present invention.
Figures 10, 11A:
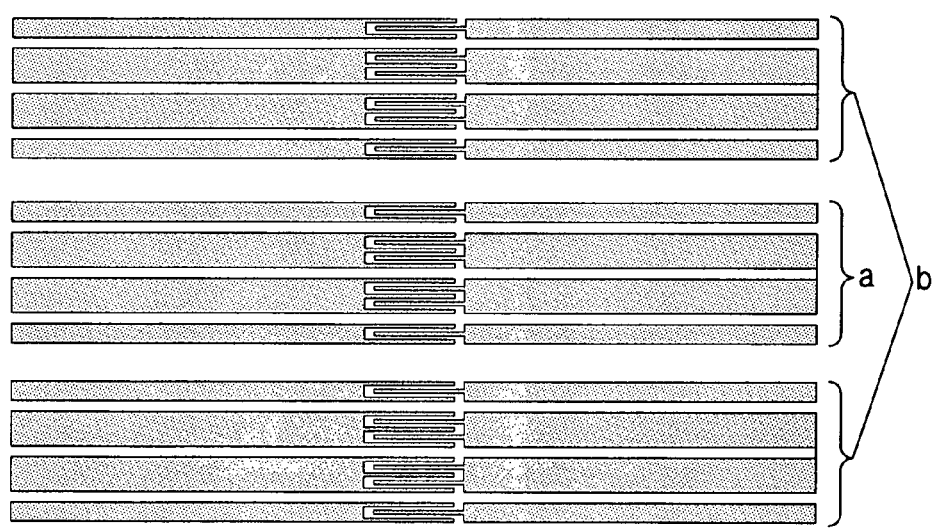
FIG. 10 is a table for describing the operation of a trimming unit according to an exemplary embodiment the present invention.
FIGS. 11A to 11C show a grouped channel structure and the states of a plate of a pressure sensor according to still another exemplary embodiment of the present invention.

The channels 312, 312' are formed parallel to each other and each channel has a comb shape formed at a predetermined position where the channel confronts with the gating part 330. In addition, the channels may be formed in such a way that two channels symmetrically arranged about the central channel have a single output. Alternatively, it is possible to classify plural channels into two or more groups and to provide a predetermined distance between adjacent two groups, and it is also possible for the channels of each group to have a single output. Likewise in this case, it is possible to form the channels in such a way that two channel groups symmetrically arranged about the central channel group have a single output. FIG. 6A illustrates single channel signal output structures of channels symmetrically arranged with reference to the central channel, and FIG. 11A illustrates the plural channels classified into three groups.

The gating part 330 includes an impurity implanted layer 332 forming a flat plate 315 for generating a stress in response to an external pressure and supporting structures 310 for supporting and reinforcing the flat plate 315.

In the above-mentioned pressure sensor, each of the channels 312, 312' is connected with signal electrodes at the opposite ends thereof, and a signal into input into one end 312 of each channel and a signal is output from the other end 312' by a gating movement according to the approach of the flat plate 315. That is, it can be said that the pressure sensor has a plural FET (Field Effect Transistor) construction in which the flat plate 315 connects the separated channels like a gate.

Figure 4A:
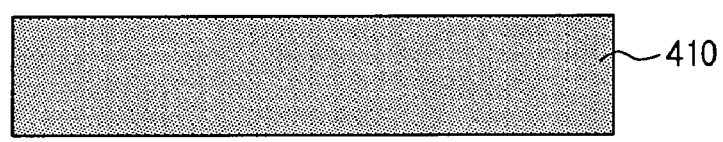
FIGS. 4A to 4G are cross-sectional views sequentially showing steps of fabricating the pressure sensor shown in FIGS. 3A, 3B and 3C.
Figure 4B:
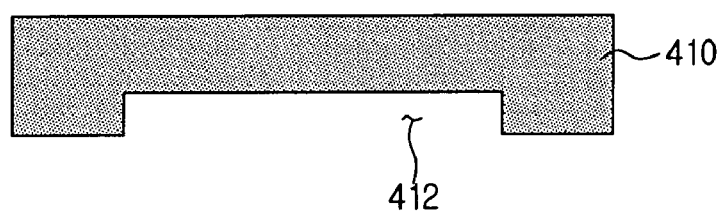
Figure 4C:
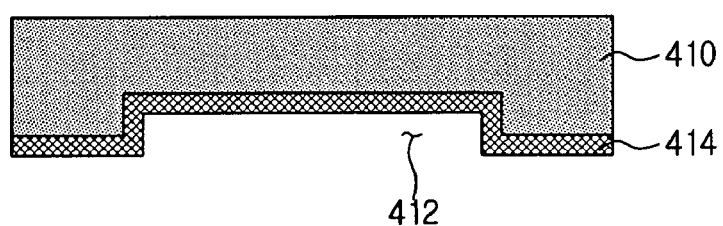
Figure 4D:
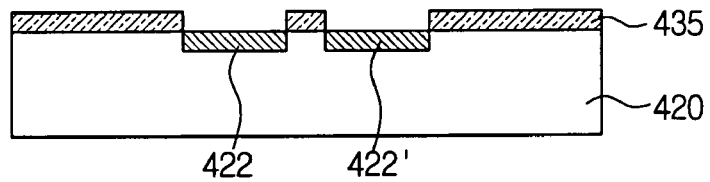
Figure 4E:
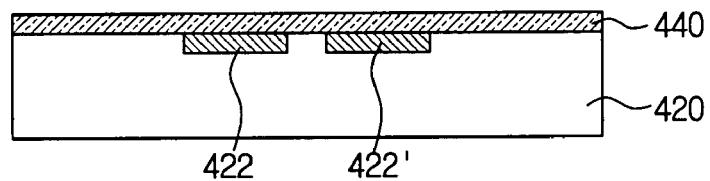
Figure 4F:
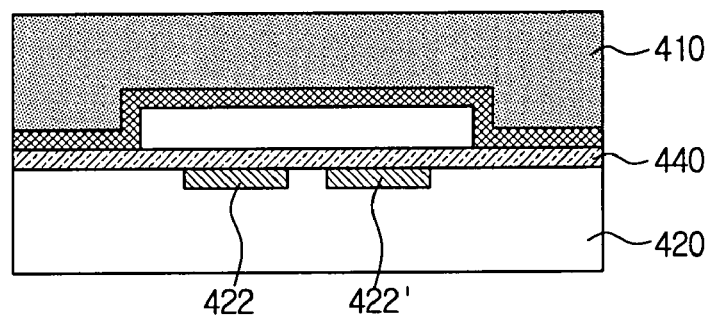
Figure 4G:
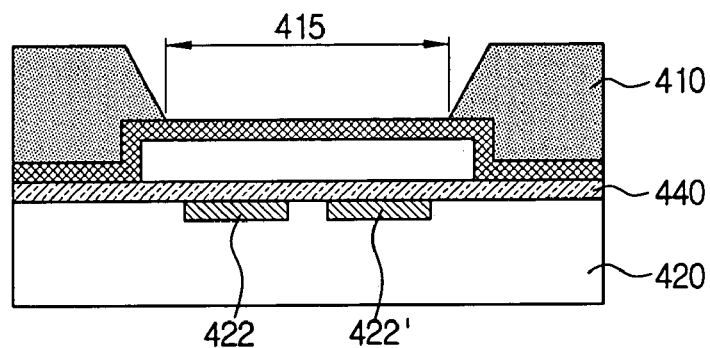

FIGS. 4A to 4G are cross-sectional views describing steps of fabricating the pressure sensor shown in FIGS. 3A, 3B and 3C. Through the drawings, it can be seen that the pressure sensor is fabricated using two semiconductor substrates. FIGS. 4A, 4B and 4C illustrate a fabricating process for a first semiconductor substrate, and FIGS. 4D and 4E illustrate a fabricating process for a second semiconductor substrate. In addition, FIGS. 4F and 4G illustrate steps of bonding and finishing the first and second semiconductor substrates.

Referring to the process of fabricating the pressure sensor in more detail, the first semiconductor substrate 410 as shown in FIG. 4A is firstly etched at a predetermined area 412 as shown in FIG. 4B, and impurities 414 are implanted along the etched side of the first semiconductor substrate 410 as shown in FIG. 4C.

Meanwhile, the second semiconductor substrate 420 is formed with channels 422, 422' at two separated areas as shown in FIGS. 4D and 4E. In order to form plural channels, photoresist 435 is firstly applied to the second semiconductor substrate 420, channels 422, 422' are patterned, then impurities are doped on the channel-formed areas.

FIG. 4d depicts the impurities are in the state of being doped through the aforementioned process. Thereafter, the photoresist 435 applied to the second semiconductor substrate 420 is removed, electrodes (not shown) for inputting and outputting signals are formed at opposite ends of the plural channels, and then an insulation layer 440 is deposited on the top surface of the second semiconductor substrate 420 formed with the electrodes.

FIG. 4E depicts the resultant structure having the insulation layer 440 deposited on the top of the second semiconductor substrate 420 after the channels were formed.

If some steps are completed for each of the first and second semiconductor substrates 410, 420 as described above, the first and second semiconductor substrates 410, 420 are bonded together in such a way that the impurity-implanted side of the first semiconductor substrate 410 and the channel-formed surface of the second semiconductor substrate 420 confront with each other. FIG. 4F depicts the bonded aspect. Next, the first semiconductor substrate 410 is etched again at the rear side of the channel-formed side as shown in FIG. 4G in the state in which the two semiconductor substrates 410, 420 are bonded together, thereby forming the flat plate 415.

In the above-mentioned pressure sensor, a contacted area is increased in the region corresponding to the plural channel-formed area as the flat plate 415 is moved in response to an external pressure, whereby it is determined which is made conductive among the plural channels. The channels made conductive by the movement of the flat plate 415 can be confirmed from the state of outputting binary information from the output ends of the channels in response to an external pressure.

FIGS. 5A to 5F show sequential movements of the pressure sensor shown in FIGS. 3A and 3B in response to an external pressure.

Figure 5A:
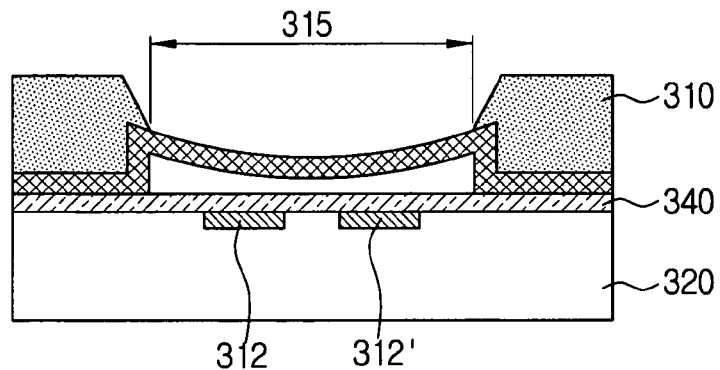
FIGS. 5A to 5F are cross-sectional views and top plan views for describing the operation of the pressure sensor shown in FIGS. 3A and 3B.
Figure 5B:
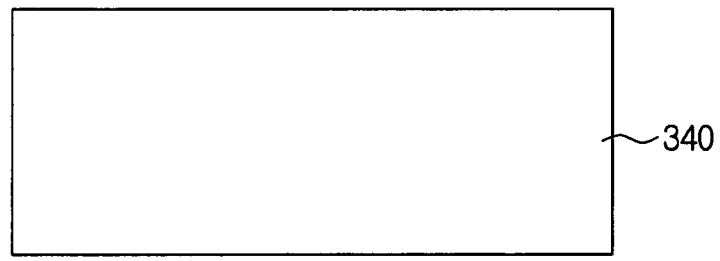
Figure 5C:
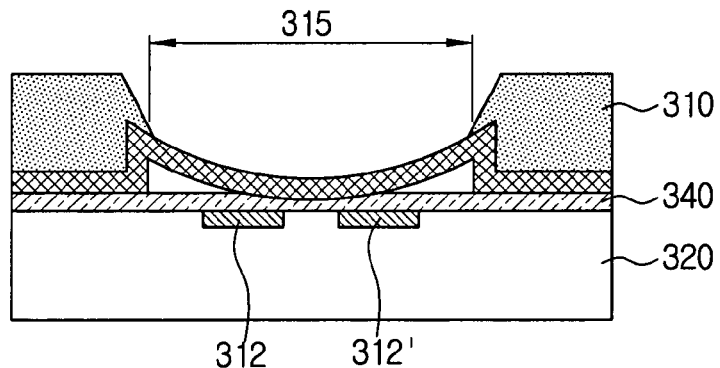
Figure 5D:
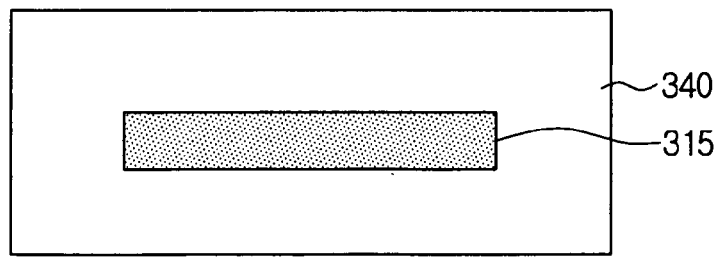
Figure 5E:
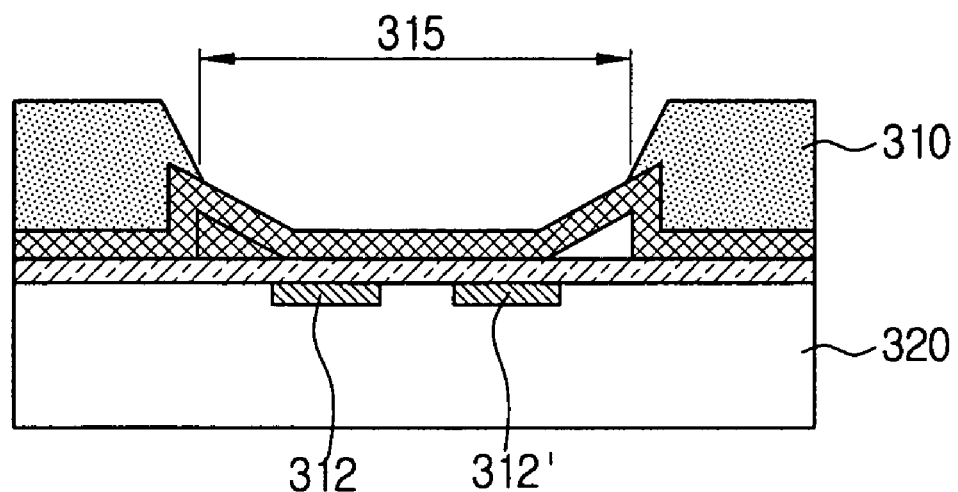
Figure 5F:
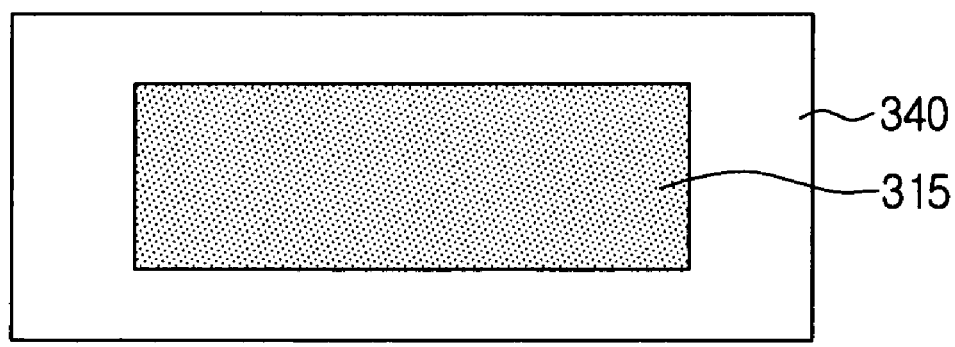

If the external pressure is transmitted to the pressure sensor as shown in FIG. 5A, the flat plate 315 moves downward. FIG. 5B depicts that the insulation layer 340 and the flat plate 315 does not yet come into contact with each other at the channel-formed area. Thereafter, as the external pressure is increased as shown in FIGS. 5C and 5E, the contacted area between the flat plate 315 and the insulation layer 340 is gradually extended from the center of the flat plate 315. That is, as the contacted area increased, the number of channels made to be conductive is also increased. FIGS. 5D and 5F are top plan views of FIGS. 5C and 5E, respectively.

Figure 6B:
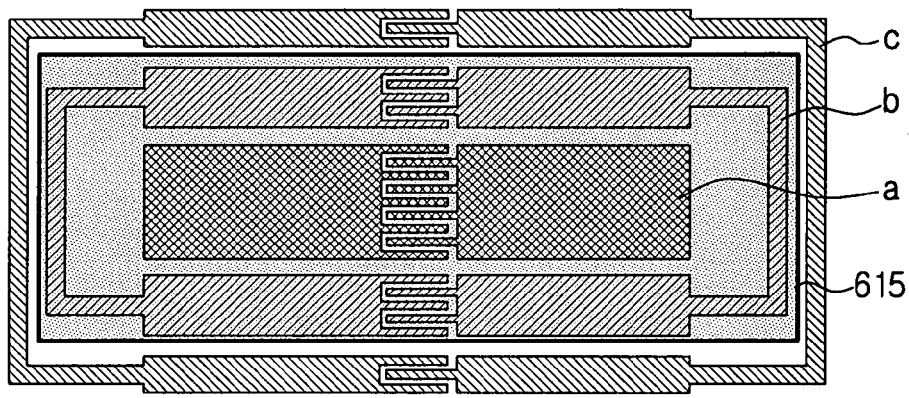
Figure 6C:
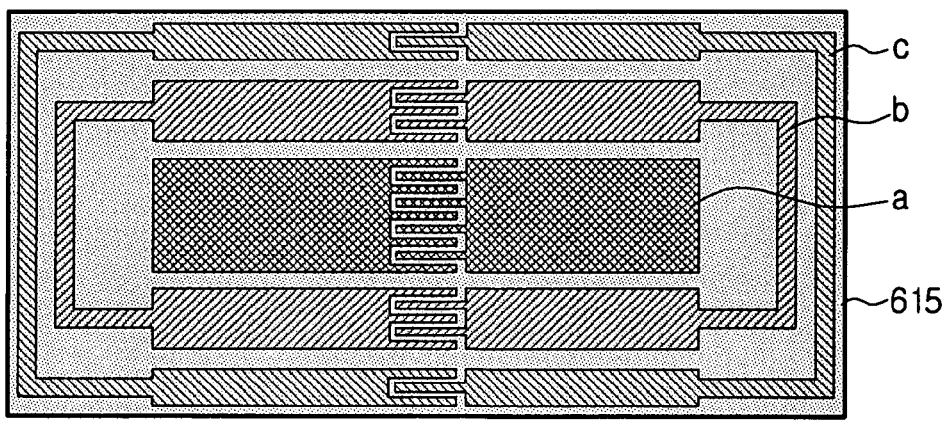
FIG. 6C illustrates a state of a flat plate.

FIGS. 6A to 6C are top plan views of the contacted state of the flat plate 615 in response to a pressure transmitted to the pressure sensor. Channels symmetrically arranged about the central channel are connected with each other to output a single channel signal.

FIG. 6A depicts the state in which the flat plate 615 is contacted with the insulation layer atop of the semiconductor substrate formed with the channels at an area corresponding to the central channel in response to a first pressure. As a result, the first channel a is short-circuited and the second channel b and the third channel c are open-circuited.

FIG. 6B depicts the state in which the flat plate 615 is contacted with the insulation layer in the area corresponding to the first and second channels a, b in response to a second pressure. As a result, the first and second channels a, b are short-circuited and the third channel c is open-circuited.

FIG. 6C depicts the state in which the flat plate comes into contact with all the channels a to c in response to a third pressure, whereby all the channels a, b and c are short-circuited.

Since the channels a, b, c are made conductive or do not depend on the contacted area between the flat plate 615 and the channel-formed area, binary output information of three bits is presented. In addition, since the binary output information of each channel a, b, c can represent first, second and third pressures, the pressure sensor has a digital output at its output terminal.

Figure 11B:
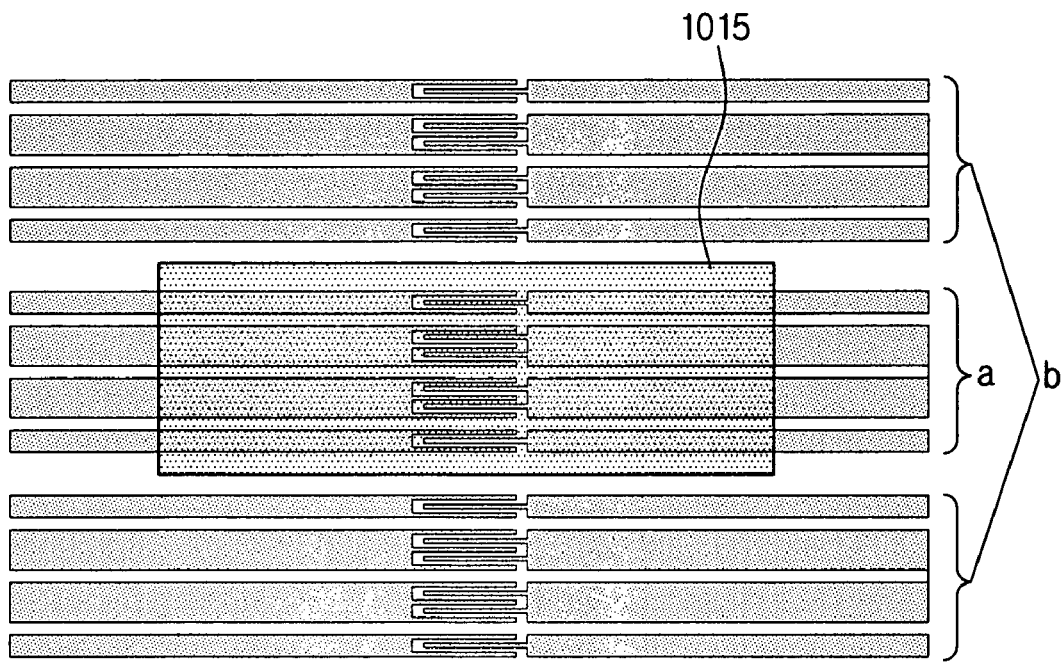
Figure 11C:
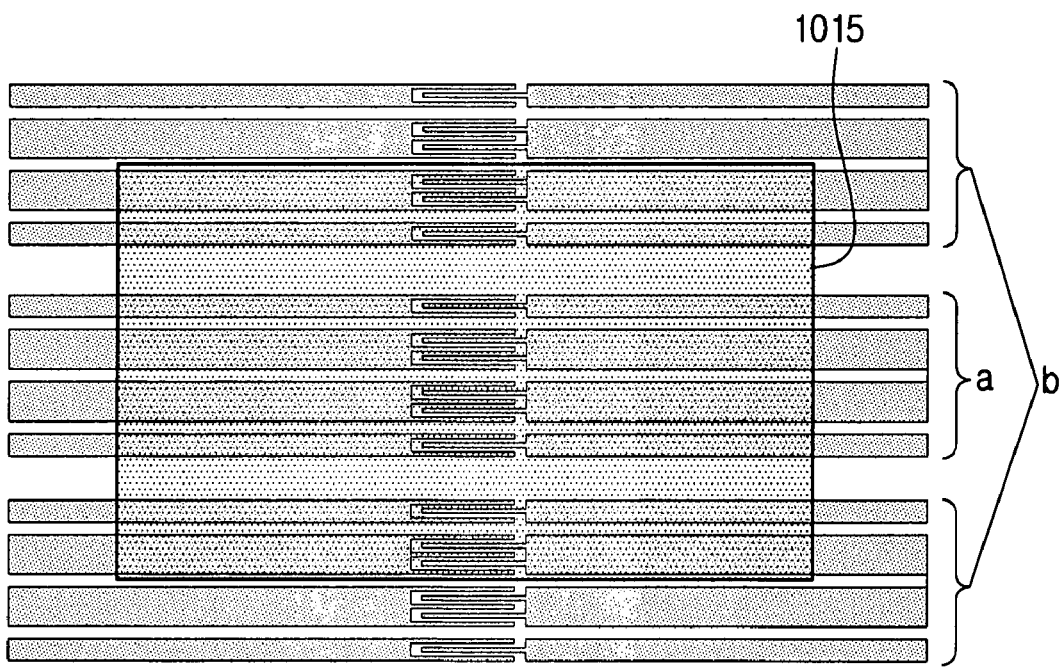

FIGS. 11A to 11C are top plan views of the contact states of the flat plate in relation to a substrate formed with channels classified into plural groups depending on a pressure transmitted to the pressure sensor along with the conditions of channels of respective states, in which FIG. 1A depicts the state in which all the channel groups are open-circuited, FIG. 11B depicts the state in which only the first channel group is short-circuited, and FIG. 11C depicts the state in which all the first and second channel groups are short-circuited.

FIGS. 7A to 7H are cross-sections illustrating steps of fabricating a pressure sensor according to another embodiment of the present invention. The pressure sensor is fabricated using three semiconductor substrates 710, 720, 730.

Figure 7A:
FIGS. 7A to 7H sequentially show steps of fabricating a pressure sensor according to another exemplary embodiment of the present invention.
Figure 7B:
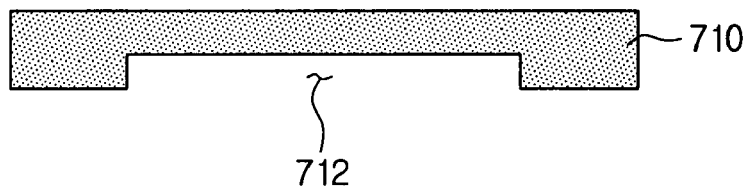
Figure 7C:
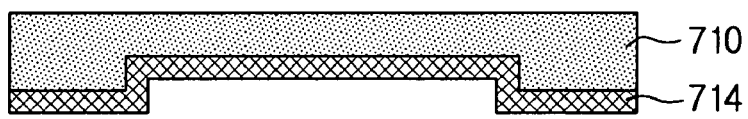
Figure 7D:
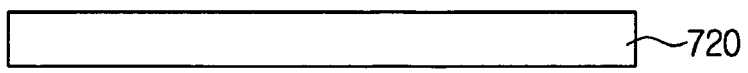
Figure 7E:
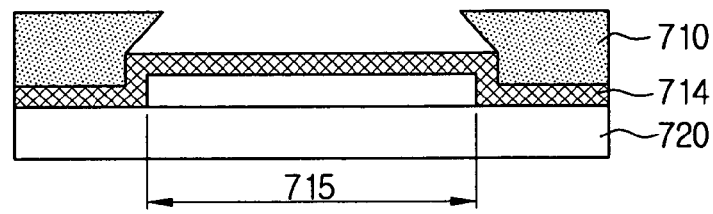
Figure 7F:
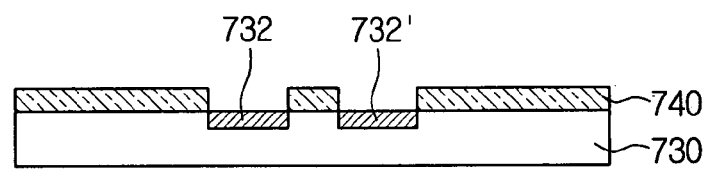
Figure 7G:
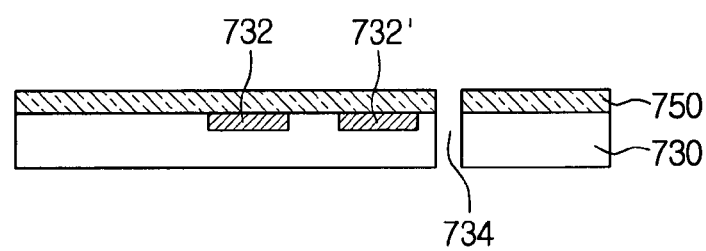
Figure 7H:
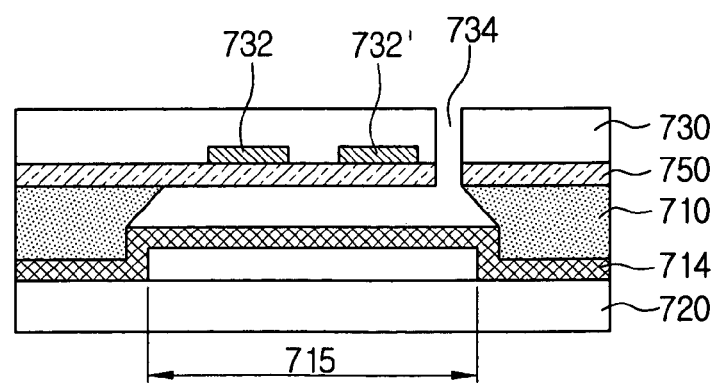

FIGS. 7A and 7C illustrate steps of processing a first semiconductor substrate 710, FIG. 7E illustrates step of bonding the first semiconductor substrate 710 and a second semiconductor substrate 720 and subsequent step, FIGS. 7F and 7G illustrate steps of forming plural channels in a third semiconductor substrate 730, and FIG. 7H illustrate a pressure sensor with a completed construction.

The pressure sensor shown in FIG. 7H is formed by following steps. At first, the first semiconductor substrate 710 shown in FIG. 7A is etched at a predetermined area 712 as shown in FIG. 7B, and an impurity layer 714 is implanted along the etched side of the first semiconductor substrate 710 as shown in FIG. 7C.

Next, as shown in FIG. 7E, the impurity-implanted side of the first semiconductor 710 is bonded to the second semiconductor substrate 720 shown in FIG. 7D and then the rear side of the first semiconductor substrate 710 opposite to the etched region is etched up to the impurity layer 714, thereby forming a flat plate 715.

Meanwhile, photoresist 740 is deposited on the third semiconductor 730 to form channels 732, 732' to correspond to the etched region of the first semiconductor substrate 710, as shown in FIG. 7F. Plural channels are formed depending on a measuring range. The process of forming the channels is same with that described above with reference to FIGS. 4D and 4E.

However, as shown in FIG. 7G, step of forming a through-hole 734 extending from an insulation layer 750 through the third semiconductor substrate 730 is added after depositing the insulation layer 750. The through-hole 734 will serve as a passage for transmitting an external pressure to the flat plate 715 formed in the first semiconductor substrate 710 after the first to third semiconductor substrates 710, 720, 730 are bonded together. FIG. 7H depicts a state in which the first to third semiconductor substrates 710, 720, 730 are bonded.

FIGS. 8A to 8F are cross-sectional views of the movements of the flat plate depending on an external pressure transmitted to the pressure sensor shown in FIG. 7H.

Figure 8A:
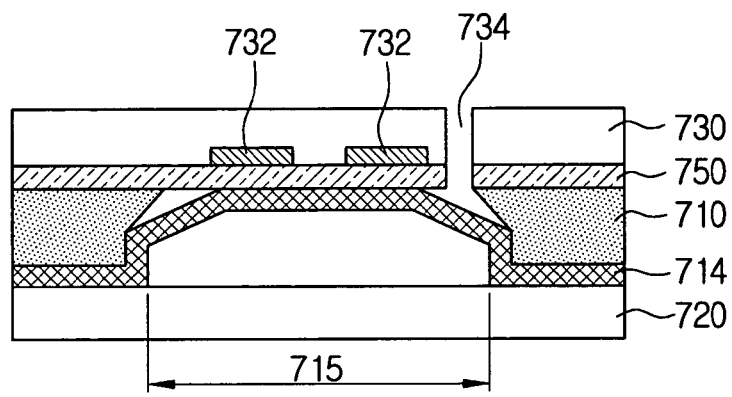
FIGS. 8A to 8F are cross-sectional views and top plan views for describing the operation of the pressure sensor shown in FIG. 7H.

If an external pressure is transmitted to the flat plate 715 of the pressure sensor through the through-hole 734 from the state in which the flat plate 715 is initially contacted with the insulation layer 750 on the channel-formed area, thereby making all the channels conductive as shown in FIG. 8A, the flat plate 715 is downwardly moved.

Figure 8B:
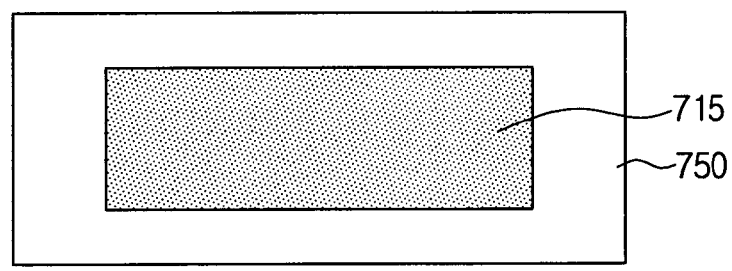
Figure 8C:
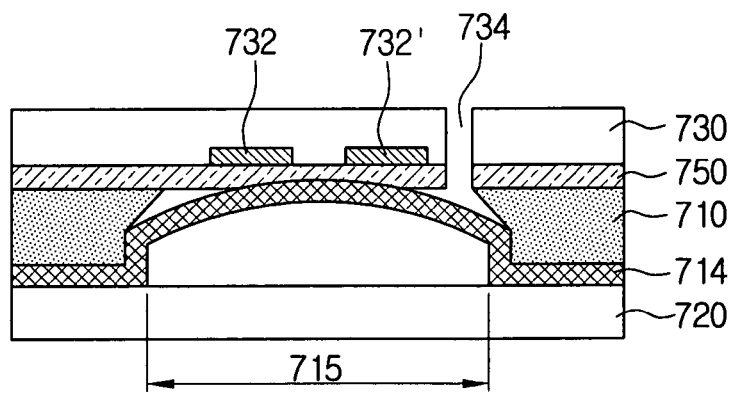
Figure 8D:
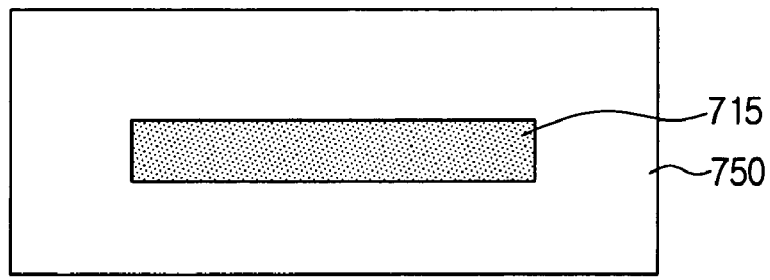
Figure 8E:
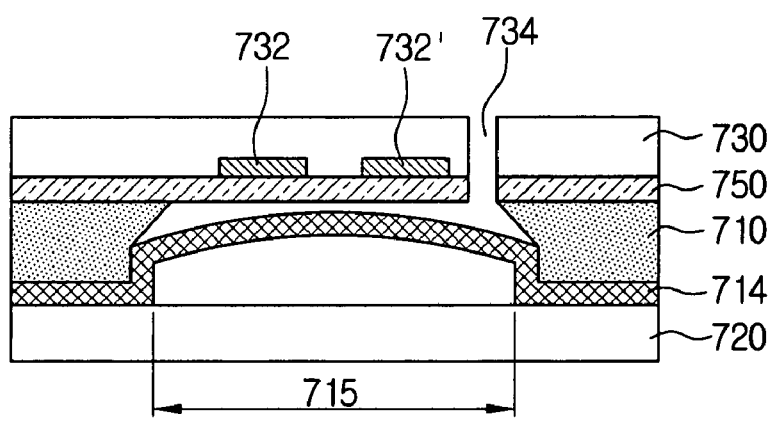
Figure 8F:
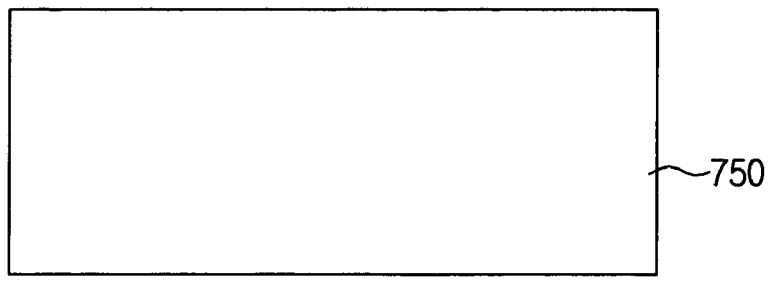

FIG. 8B illustrates the state in which the contact between the insulation layer 750 and the flat plate 715 is still retained. Thereafter, as the external pressure is increased, the flat plate 715 comes gradually apart from the insulation layer 750 on the channel-formed area from the opposite sides toward the center of the insulation layer 750 as shown in FIGS. 8C and 8E, whereby the contacted area between the flat plate 715 and the insulation layer 750 gradually decreases. That is, the number of conductive channels decreases. FIGS. 8D and 8F are top plan views of FIGS. 8C and 8E, respectively.

With the above-mentioned pressure sensor, it is determined which is made conductive among the plural channels as the contacted area of the flat plate in relation to the plural channels decreases depending on an external pressure, as a result of which binary information of each channel is output from the output terminal of the channel.

That is, as compared with the pressure sensor shown in FIG. 3, the pressure sensor shown in FIG. 7H is similar to the pressure sensor of FIG. 3 in that the measurement results are presented as digital information, although the output information of each channel in response to a pressure is different from that in the pressure sensor of FIG. 3.

Figure 9:
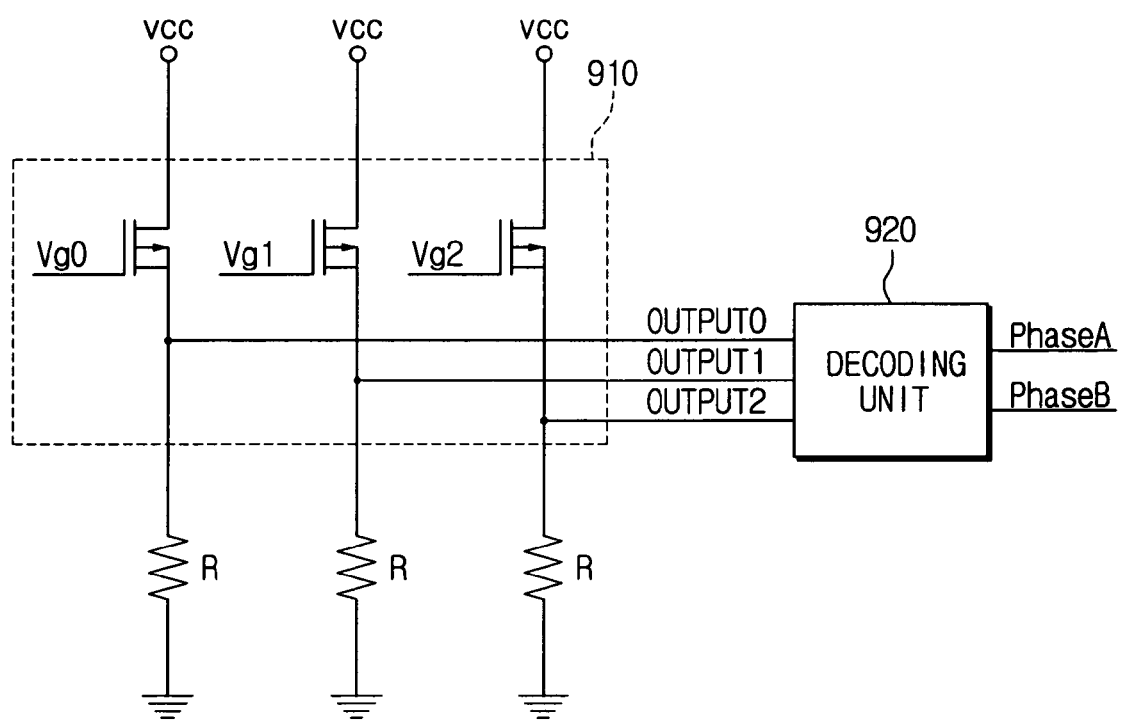
FIG. 9 is a circuit diagram of a pressure sensor and a decoding unit according to an exemplary embodiment of the present invention.

FIG. 9 is a circuit diagram of a pressure sensor 910 and a decoding unit 920 according to an exemplary embodiment of the present invention. The pressure sensor 910 is represented as first to third FET's, each outputting a channel input signal in response to a gate signal, and the decoding unit 920 is shown as outputting predetermined pressure level signals, "Phase A" and "Phase B" by receiving output signals, "OUPUT 0," "OUTPUT 1," and "OUTPUT 2" from respective FET's.

The first to third FET's of FIG. 9 indicate channels formed on a semiconductor substrate as described above with reference to a fabricating process thereof, and respective gating signals for determining which of the first to third FET's is made conductive or not according to a movement of the flat plate in response to a pressure.

In order to sense a pressure using a pressure sensor having a digital output in the decoding unit 920, it is important how to set intensity of pressure depending on respective output signals "OUTPUT 0," "OUTPUT 1," and "OUTPUT 2" of the plural channels formed in the semiconductor substrate.

Next, the decoding unit 920 detects which is made conductive among the plural channels according to an external pressure, calculates a pressure level on the basis of respective output signals, "OUTPUT 0," "OUTPUT 1," and "OUTPUT 2" determined depending on which is made conductive among the plural channels, and previously set pressure intensity information, and then outputs external pressure level signals "Phase A," and "Phase B."

Although not shown in the circuit diagram, a digital processing unit for processing a digital output of the pressure sensor including the decoding unit 920 may further include a trimming unit so that a gating error of the flat plate caused by a process error of the pressure sensor 910 beyond the decoding unit 920 can be externally corrected.

Specifically, if the flat plate does not gate a previously set channel by a channel neighboring the previously set channel due to a process error caused during the fabrication of the pressure sensor, incorrect information may be output. The trimming unit may be provided so as to allow the manual correction of output information of the decoding unit when such incorrect information is output.

Figure 1:
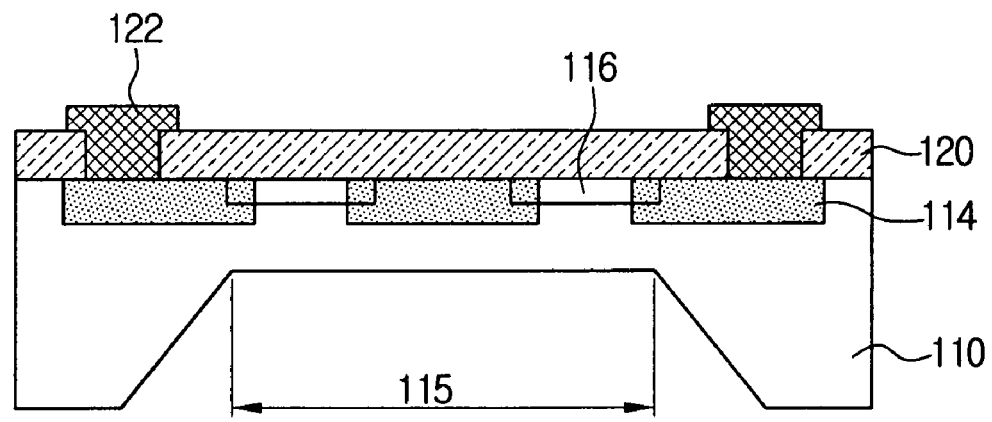
FIG. 1 is a cross-sectional view of a conventional piezoresistive pressure sensor.
Figure 2:
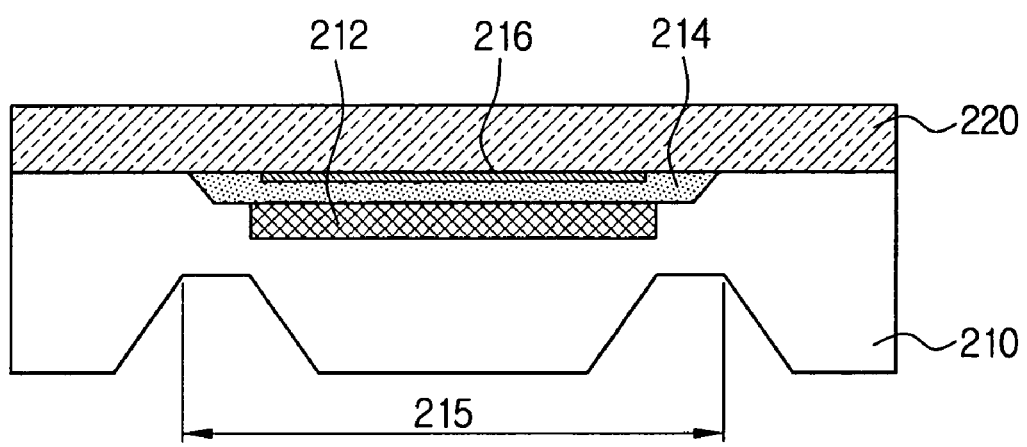
FIG. 2 is a cross-sectional view of a conventional electrostatic capacitive pressure sensor.

In other words, if channels were designed to be classified into two or more groups and formed in the semiconductor substrate as shown in FIGS. 11A to 1 IC, so that the first central channel group a and the second symmetrically arranged groups b are made conductive through the flat plate by a first pressure, and then the process of forming the channels were performed, a tolerance may be caused depending on a process error. Accordingly, it is needed to perform external trimming so as to enhance a yield of such sensors.

The process of setting an intensity of pressure depending on an output signal for each of the plural channels through the trimming unit comprises steps of: applying a test pressure to the flat plate, and correcting a gating error of the flat plate for neighboring channels according to the test pressure. The decoding unit includes a table for binary output values for respective channels and the correcting step converts the channel output values according to a gating error to be used as output information set in the decoding unit for the test pressure.

FIG. 10 illustrates a table for describing an example of trimming in a process of calibrating a pressure sensor according to an exemplary embodiment of the present invention. In the table, the pressure sensor is designed to have eight sensor outputs and the decoding unit is designed to have two outputs.

If the pressure sensor was designed in such a way that channel signals of third to fifth channels are transmitted to the decoding unit for a test pressure in the state in which the decoding unit has a table as shown in the drawing and fabricated, the decoding unit will receive third to fifth channel signals for the test pressure in a normal state.

The table shows that the first to third gate signals $Vg0 \sim Vg2$ are transmitted for a movement of the flat plate for making the third to fifth channels conductive. However, the signals of the fourth to sixth channels indicated by the second to fourth gate signals $Vg1 \sim Vg3$ may be transmitted for the test pressure due to a process error.

At this time, in order to correct the error, the table using range is converted so that the output information set for the test pressure can be output for the signals of the fourth to sixth channels presently transmitted to the decoding unit.

That is, although the first block A is used in the table in the normal state, it is intended that the level output information is output with reference to the second block B in the table when the signals of the fourth to sixth channels are transmitted for the test pressure. In addition, for another channel gating error, it is intended that the third block C is utilized.

Subsequently, the decoding unit can output the most possible pressure level information with reference to the second block B for the channel signals transmitted according to an external pressure if the table using ranges were converted as described above.

Consequently, the trimming operation merely changes the positions of channels to be used for an external pressure but makes it possible to obtain an identical result in terms of measurement of a pressure level. Therefore, it is possible to improve yield through the trimming operation.

Meanwhile, the term, "the most possible pressure level" denotes that because the highest detected pressure level set by a user may be changed as the table using ranges are converted, it is possible to form extra channels corresponding to the flat plate so that they can be used as desired under a certain circumstance, for example, when an error is caused, although those extra channels are not used under a normal circumstance. At this time, it is natural that the decoding unit should have extra channel signal input terminals, of which the number corresponds to that of the extra channels.

According to the present invention as described above, it is possible to greatly reduce power consumption as compared to the prior art because the pressure sensor provides digital outputs: Furthermore, because an external circuit can be simplified, the manufacturing costs can be greatly saved.

While the exemplary embodiments of the present invention have been shown and described in order to exemplify the principle of the present invention, the present invention is not limited to the specific embodiments. It will be understood that various modifications and changes can be made by one skilled in the art without departing from the spirit and scope of the invention as defined by the appended claims. Therefore, it shall be considered that such modifications, changes and equivalents thereof are all included within the scope of the present invention.

What is claimed is:

1. A pressure sensor having a digital output, the pressure sensor comprising:
    a substrate formed with a plurality of channels; and
    a gating part disposed on the substrate so that an area of the gating part which confronts the channels is spaced apart from the substrate and movable in response to an external pressure to cause the channels to become selectively conductive.

2. The pressure sensor as claimed in claim 1, wherein the channels are arranged parallel to each other.

3. The pressure sensor as claimed in claim 1, wherein the channels have a comb shape at a position confronting the gating part.

4. The pressure sensor as claimed in claim 1, wherein the channels comprise two channels which are symmetric about a central channel having a single channel output.

5. The pressure sensor as claimed in claim 1, wherein the channels are classified into a predetermined number of groups and two adjacent groups are spaced apart at a predetermined distance.

6. The pressure sensor as claimed in claim 1, wherein the gating part comprises:
    a flat plate portion which confronts each of the channels and generates a stress depending on an external pressure to cause the channels to become selectively conductive; and
    a support structure which reinforces and supports the flat plate portion.

* * * * *